United States Patent Office 2,874,030
Patented Feb. 17, 1959

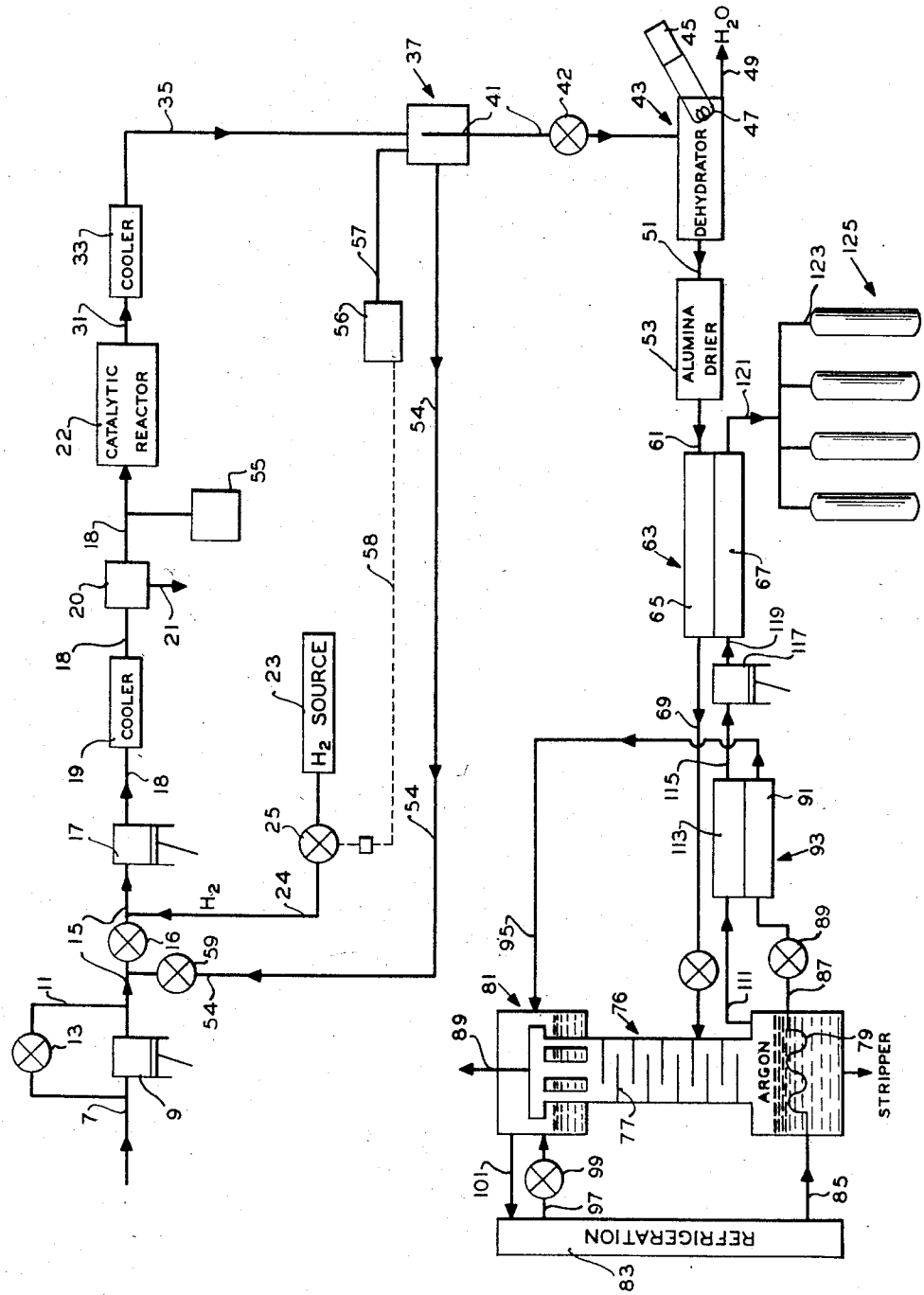

2,874,030

ARGON PURIFICATION

Wolcott Dennis, Scotch Plains, N. J., assignor to Air Reduction Company, Incorporated, New York, N. Y., a corporation of New York Application December 19, 1952, Serial No. 326,986

3 Claims. (Cl. 23—209)

This invention relates to the purification of gases and more particularly concerns the purification of a crude argon fraction containing small percentages of oxygen and nitrogen.

Until recently the principal use of argon was for filling electric light bulbs in order to get an increase in luminosity. Argon used for this purpose can contain some nitrogen since the presence of nitrogen serves a useful function but no oxygen is permissible. However, the recently developed inert gas shielded, arc welding process requires an argon product which is substantially devoid of nitrogen. Very high purity argon has proved most useful in this welding and, even when some oxygen is permissible in the shielding gas as is the case in some instances, it is preferred to operate a high purity argon purification system so that the more frequently used high purity argon is obtained. Operating in this manner the high purity argon is always available and it can be modified to include the various oxygen percentages which are helpful for certain different welding operations or otherwise modified.

The first step in obtaining argon is the production of crude argon. This can be accomplished by many methods. Some of these methods are shown on page 220 of Ruheman's book entitled, The Separation of Gases, 1949. By certain of these methods crude argon containing small percentages of oxygen and nitrogen is separated in appreciable amounts from atmospheric air which contains less than 1 percent argon. In order to obtain high purity argon (over 99 percent pure), it is, of course, necessary to remove the small percentages of oxygen and nitrogen which together constitute about 3–10 percent of the crude argon.

It has been proposed to produce high purity argon by the use of heated copper pellets to remove oxygen and by the use of a rectification column to remove nitrogen. There has also been a recent patent issued on the removal of oxygen from rare gases (without specific reference to argon) by catalytically reacting, over a 5 percent palladium on alumina catalyst, the oxygen impurity with admixed hydrogen to form water which is then removed by conventional means.

The instant invention has as its broad object a superior, practical and easily-controlled method and apparatus for removing all of the oxygen and nitrogen from crude argon containing small percentages of oxygen and nitrogen by an improved combination of process steps and apparatus.

Another object is the provision of improved means, in conjunction with argon purification, for transferring the argon product to high pressure cylinders without compression of gaseous argon.

A further object is to provide improved simplified means for the effective removal of oxygen by utilization of admixed hydrogen and a 5 percent palladium on alumina catalyst.

An additional object is the provision of a novel combination of an oxygen removal step involving a catalytical reaction between oxygen and hydrogen and a nitrogen removal step involving rectification in a continuous integrated process for purifying crude argon containing small amounts of oxygen and nitrogen with resulting high yields of purified argon.

In accordance with the process in which the present invention is incorporated, crude argon containing oxygen and nitrogen is compressed initially to a pressure which is sufficient both for flow through the oxygen purification steps and for rectification. With hydrogen added in an amount more than is necessary to combine with the oxygen content, the crude argon is passed through a catalytical reactor which promotes the flameless reaction between the hydrogen and oxygen to form water. Thereafter the water is removed from the oxygen-free argon by condensation and drying. Next the oxygen-free, dehydrated argon is separated from the nitrogen and the residual hydrogen by means of a rectification column. The argon is preferably removed from the rectification column as a vapor and then condensed into a liquid which is pumped at high pressures. After pumping, the argon product is vaporized by heat exchange with dehydrated, oxygen-free argon and then is transferred into cylinders. The admixed hydrogen, in the preferred arrangement, is introduced prior to the compression of the crude argon. In order to operate with safety and to obtain an effective catalytical reaction at low temperatures, a portion of the oxygen-free argon is preferably recycled in order to dilute the oxygen content of the incoming crude argon.

The achievement of the above-mentioned objects and others, along the features of the invention, will be more clearly apparent from the following description and the accompanying drawing.

On the schematic drawing, the inlet pipe for crude argon containing small percentages of oxygen and nitrogen is designated by reference numeral 7. Pipe 7 passes crude argon to feed compressor 9 where the pressure of the crude argon is increased to about 45 p. s. i. g. This pressure is regulated by suitable conventional means (not shown). A by-pass 11 having control valve 13 is provided for passing some of the compressed argon from the compressor 9 back to inlet pipe 7, if desired. The compressed crude argon is discharged from compressor 9 into pipe 15 connected thereto and then flows towards manual control valve 16 in pipe 15. Valve 16 is utilized to reduce the pressure, by throttling, of the flow therethrough so that the proper flow is provided for the catalytical reactor 22 as determined by space velocity considerations. As explained hereinafter, conduit 54 which joins pipe 15 upstream from valve 16, is used to pass recycle, oxygen-free argon into pipe 15 so that the gaseous flow through valve 16 can be designated as diluted crude argon or a cycle flow, which is comprised of oxygen-free argon and crude argon containing oxygen. In order to remove the oxygen by the flameless catalytical reaction with hydrogen in reactor 22, hydrogen is added to the cycle flow by means of conduit 24 which joins conduit 15 downstream from its valve 16.

The cycle flow, now comprised of crude argon, recycle oxygen-free argon, and added hydrogen, is next compressed to about 55 p. s. i. g. in cycle compressor 17. It is to be noted that this pressure is sufficient to give the necessary pressure (about 35 p. s. i. g.) for the subsequent rectification step, after the pressure drop resulting from movement through the oxygen purification portion of the process.

The compressor 17 is a centrifugal displacement type of pump, consisting of a round, multi-bladed rotor revolving freely in an elliptical casing partially filled with water. The water circulates at high speeds and as it contracts and expands in following the contours of the elliptical casing, it compresses the gas. This type of compressor has a constant capacity at uniform suction pressure. The water is removed from the gas by a baffle separator (not shown). This water can be recirculated, after cooling, to the compressor 17 in order to avoid loss of any argon in the water, if desired.

After compression to 55 p. s. i. g. in compressor 17, the cycle argon flows through conduit 18 having a water-cooled cooler 19 and a conventional water separator 20. In cooler 19 the compressed argon has its temperature lowered to about that of the cooling water with the result that appreciable amounts of water are separated in separator 20 and removed therefrom by pipe 21 connected to the bottom of the separator 20. From separator 20, the cycle argon flows on in conduit 18 to catalytical reactor 22.

In order to effect the removal of oxygen by a catalytical reaction with hydrogen in reactor 22, hydrogen from source 23 is passed (as above mentioned) through conduit 24 having control valve 25 and joins the flow of diluted crude argon in conduit 15 at a point prior to compressor 17. It is to be noted that, by introducing the hydrogen prior to compressor 17, the hydrogen is effectively mixed with the raw argon in compressor 17. The quantity of hydrogen which is introduced by means of conduit 23 is an amount which is definitely (about 0.5 percent) in excess of stoichiometric amount necessary to react with substantially all of the oxygen in the raw argon. The means for controlling the amount of introduced hydrogen will be described subsequently.

The crude argon containing hydrogen in passing through reactor 22 is converted into oxygen-free argon. This step is effected by the flameless reaction between the added hydrogen and the oxygen in the raw argon over a 5 percent palladium on alumina catalyst. This catalytical reaction occurs in the manner disclosed in Patent No. 2,582,885, issued to Rosenblat on January 15, 1952. Reference can be had to this patent for the details of this catalytical reaction, such as the composition of the catalyst and operating temperature.

Since the oxygen in the crude argon and the added hydrogen are converted to water in reactor 22, the next step is to remove this water. This is accomplished by passing the warm oxygen-free argon through conduit 31 to water-cooled cooler 33. The cooled oxygen-free argon next passes through conduit 35 to separator 37. In separator 37 the oxygen-free argon which is to be further dehydrated and purified passes through conduit 41 which extends into the upper space of the separator 37. This argon is still saturated with water and passes through conduit 41 to main dehydrator 43. The remainder of the oxygen-free argon, along with entrained water due to the action in separator 37, is removed from the bottom of the separator 37 by conduit 54 for recycling which will be further described hereinafter. Dehydrator 43 is provided with a conventional refrigeration system 45 having evaporator 47. By this means, substantially all of the remaining water is removed from the oxygen-free argon and is discharged through conduit 49 connected to the bottom of dehydrator 43. In order to remove the residual traces of water, the oxygen-free argon is passed from dehydrator 43 by means of conduit 51 to a drying system 53 comprised of a pair of the well known alumina dryers.

Before describing the removal of the nitrogen and excess hydrogen from the dehydrated, oxygen-free argon, certain features relating to the oxygen-water removal process will be pointed out.

In order to remain within the effective limits for the catalytical reaction and also to remain definitely inside explosive limits throughout the oxygen removal phase, some of the oxygen-free argon is divided from the process flow of oxygen-free argon at separator 37 (as above mentioned) and is returned along with water by means of conduit 54 to the compressed stream of argon flowing in conduit 15. In this manner the incoming raw argon is diluted so that the percentage of oxygen is maintained below 3 percent, preferably about 1 percent. Interference with the catalyst by excessive temperatures due to the reaction of oxygen and hydrogen and the danger of explosions is thus avoided, and an efficient reaction results.

The foregoing dilution operation can be effected in a simple manner by having a supply of crude argon which has a definite percentage of oxygen and by providing a dilution ratio (that is, volume of oxygen-free argon to crude argon) which definitely assures less than a 3 percent oxygen content in the argon passing to the reactor even when the oxygen is at the maximum. In this manner, no adjustments of valves or other apparatus in response to an analysis of oxygen content is necessary. With this arrangement the quantity of crude argon admitted to pipe 7 is proportioned to the flow in pipe 41 leading to dehydrator 41 by means of valves and rotameters (not shown).

It is to be noted that the pressure of the recycle argon is not reduced to atmospheric but is maintained at the pressure about that which is required as the suction pressure for compressor 17.

On the other hand, if it is not desired to maintain a crude argon supply having a definite percentage of argon, or to dilute with a large safety margin, an analysis of the argon entering the reactor for oxygen content can be made and suitable adjustments can be made in order to provide a reactor feed which has the desired, approximate 1 percent oxygen content. Thus, assuming the crude argon supply is permitted to, or does increase, in oxygen content so that the feed to the reactor begins to exceed 1 percent, this can be noted by a gas analysis with conventional gas analyzer 55 which is connected to conduit 18 and then suitable adjustments can be made by means of valve 13 in the by-pass around compressor 9 and the controls (not shown) of the rectification column and associated apparatus.

The above-mentioned control means for maintaining definitely an excess of hydrogen, relative to the oxygen in the crude argon passing to reactor 22, comprises a conventional hydrogen analyzer 56 connected to the top of separator 37 by conduit 57. The hydrogen analyzer 56 is effective in controlling the introduction of hydrogen through valve 25 by regulating valve 25 through connection 58 extending between the valve 25 and the hydrogen analyzer 56. In this manner the oxygen-free argon flowing in drying system 53 has an appreciable quantity of hydrogen, as well as nitrogen which was in the original crude argon.

After being substantially completely desiccated by means of the alumina drier system 53, the further dehydrated, oxygen-free argon passes through conduit 61 to the heat exchanger 63 where the further dehydrated oxygen-free argon in passage 65 gives up heat to vaporize the final argon product, flowing in passage 67 of heat exchanger 63. In exchanger 63, most of the minute amounts of products (carbon dioxide) from oxidation of hydrocarbon contaminants, if any, and traces of water will be deposited and removed due to the low temperature conditions. The quantity of these deposits is so small that no appreciable interference occurs during prolonged runs of the apparatus. Purging can easily be effected during unavoidable shutdowns. After being so cooled to about −280° F., the argon, now at a pressure of about 35 p. s. i. g. due to the pressure drop resulting from passing through the previously described system, flows through conduit 69 to the argon stripper 76. The dried and oxygen-free argon, entering stripper 76, still contains nitrogen and the excess of the hydrogen which was added. This ternary mixture is introduced at about the midpoint of rectification column or stripper 76, Column 76 is the type which is well known in the art and has the usual bubble-cap-tray construction 77 which serves to effect the intimate contact between a descending liquid and an ascending vapor as is used for rectification of a mixture of vapors and liquefied gases. The column 76 also has a conventional boiler 79 in the bottom of the column where a pool of liquefied argon collects and a conventional condenser 81 in the top of the column which serves to condense the less volatile gas of the gaseous mixture. With this arrangement, the ternary mixture of argon, hydrogen and nitrogen is separated into an argon fraction which collects around the boiler 79 and a hydrogen-nitrogen-argon fraction which passes as a vapor up through the top of the condenser 81 and out through conduit 39. Thus an argon product of high purity is obtained as a liquid by the stripping out of the more volatile hydrogen and nitrogen.

A refrigeration system 83 is arranged to supply suitable fluids to the boiler 79 and the condenser 81 of stripper 76. This arrangement includes conduit 85 which is connected between the refrigeration system 83 and the boiler 79. After being cooled in boiler 79, the fluid flows through conduit 87 having expansion valve 89, passage 91 of liquefier 93, and conduit 95 which is connected to condenser 81. Another conduit 97 having expansion valve 99 also delivers a suitable refrigerant fluid to condenser 81. The refrigerant vapors which are formed in condenser 81 by indirectly absorbing heat in condensing the less volatile vapors in tubes of condenser 81 are returned to the refrigeration system 83 by means of conduit 101 connected to the top of the refrigerant space of the condenser 81.

The refrigeration system 83 in the instant process comprises means for obtaining air at about 5.6 atmospheres pressure in a saturated condition and a rich liquid (oxygen-enriched liquid air) also at about 5.6 atmospheres absolute. The rich liquid in proper condtiion is admitted to condenser 81 by means of conduit 97 and valve 99 which reduces the pressure of the rich liquid to about 1.4 atmospheres absolute. The saturated air stream at about 5.6 atmospheres is used in boiler 79 to boil the liquid argon and then, after being expanded to about 1.4 atmospheres absolute by valve 89, is used to liquefy gaseous argon in liquefier 93. Thereafter this air fluid joins the above-mentioned rich liquid in condenser 81 where the pressure is slightly above atmospheric pressure. Of course it is to be understood that other fluids having comparable characteristics, such as nitrogen, could be used in place of saturated air and rich liquid. It is to be noted that the limiting temperature in the upper part of the stripper 76 is the temperature at which argon would freeze at the prevailing pressure in the stripper which in the preferred embodiment is about 20–30 p. s. i. g.

In order to get an argon product which is free of traces of any impurities, such as solid carbon dioxide or water ice which may have passed through the exchanger 63, argon vapors are removed from the space above the level of the pool of argon in the bottom of the stripper 76. This is done by means of conduit 111 which then conveys the argon vapors to argon liquefier 93. The fluid which is used to boil the liquid argon and thus absorb heat therefrom is brought to argon liquefier 93, as above mentioned, by means of conduit 87. This conduit 87 extends between boiler 79 and passage 91 of argon liquefier 93. In flowing through passage 91, the fluid absorbs heat from the argon vapors (flowing counter-currently in passage 113 of argon liquefier 93) and thus condenses the argon vapors into a liquid argon product.

After being liquefied, the argon flows in pipe 115 to liquid argon pump 117 where the pressure of the argon liquid is increased to about 2500 p. s. i. g. Thereafter the argon flows by means of conduit 119 to passage 67 of heat exchanger 63 where the liquid argon is vaporized. After this vaporization by absorbing heat from the dehydrated, oxygen-free argon, the argon gases pass through conduit 121 to the argon manifold 123 to which argon cylinders 125 are connected.

Referring to the oxygen removal process and apparatus which involves catalytical reactor 22, the hydrogen analyzer 56 which maintains the excess hydrogen, is, in practice, a thermal conductivity cell gas analyzer. This control system together with the point of introduction of the hydrogen feed 24 to the suction of compressor 17 has resulted in close control of the percentage of hydrogen and it is possible to maintain the excess hydrogen at about 0.5 percent so that economy results.

It is to be noted that, by definitely maintaining an appreciable excess of hydrogen and providing a low concentration of oxygen by the recycle, all of the oxygen is removed from the crude argon in the catalytical reactor 22 by conversion into water and the reaction occurs at a low temperature which presents side reactions, such as involve nitrogen.

It is to be understood that the dilution of the crude argon is not necessary if the crude argon contains less than 3 percent oxygen. Under such circumstance, the steps involving the addition of excess hydrogen, the catalytical reaction, the dehydration and the rectification can be applied directly to the crude argon.

It is also to be noted that the water content of the compressed argon feed, due principally to the water content of the recycled oxygen-free argon which is mixed with the argon admitted by pipe 11, is appreciably reduced by water separator 20 which treats the argon flow prior to catalytical reactor 22 so that interference with the catalyst due to water is minimized.

For the removal of water, it is to be appreciated that the mechanical refrigerator 45 can be replaced by other means to supply refrigerant for dehydrating the oxygen-free argon. For instance, a suitable fluid from the refrigeration system 83 can be used for this purpose.

A typical feed to the stripper 76 comprises 1–5 percent nitrogen, ½–2 percent hydrogen, with the remainder being argon. The lower stripping section of stripper 76 acts to separate the binary argon-nitrogen to produce an argon bottom of the required purity. The upper rectifying section treats a ternary mixture of argon, nitrogen and hydrogen to produce an overhead low in argon which operation, therefore, gives a high argon recovery for the column. This recovery is about 85 percent of the argon in the feed to the stripper 76.

It is also to be understood that the entire foregoing process and apparatus is especially adapted for treating crude argon which contains less than 10 percent oxygen and less than 1 percent nitrogen.

It is believed that the operation of the instant method and apparatus is clear, from the foregoing description, to one skilled in the art. It is believed apparent that a novel inventive combination of steps and features for the removal of oxygen and nitrogen from crude argon in a superior manner has been provided. Thus, all of the oxygen in crude argon is catalytically reacted with admixed, excess hydrogen forming water; and, after removing the water, the excess hydrogen is removed along with nitrogen to give a high purity argon. Other salient features are the steps of recycling oxygen-free argon, compressing the crude argon initially to a high pressure, and introducing the hydrogen prior to compression. It is also significant that the refrigeration fluid is used to liquefy the purified, gaseous argon to give a liquid free of solids and that the dehydrated, oxygen-free argon is used to vaporize the liquefied argon after it is pumped. It is believed clear that the process of the instant invention is easily controlled, provides for the removal of all of the oxygen without the danger of explosions and gives high yields of high purity argon.

It is to be understood that one skilled in the art can make various changes in the instant invention as herein disclosed in its preferred form without departing from the invention as defined in the following claims.

I claim:

1. The method of purifying impure argon containing oxygen as an impurity comprising adding hydrogen to said impure argon, in excess of the stoichiometric amount required for the reaction of said hydrogen with the oxygen impurity to form water, passing the resulting gas mixture over a catalyst adapted to promote a catalytic reaction between the oxygen and hydrogen to form water and a substantially oxygen-free argon, analyzing said oxygen-free argon to detect the presence of residual hydrogen in excess of the stoichiometric amount required for said catalytic reaction and controlling the addition of said hydrogen to said impure argon in response thereto to maintain said excess, recycling argon from which the oxygen has been removed to said catalytic reaction and maintaining the concentration of oxygen in said reaction below about three percent, drying oxygen-free argon obtained from said catalytic reaction and rectifying said dried, oxygen-free argon, to form a substantially pure argon product separated from the other constituents of said dried oxygen-free argon.

2. The method of treating impure argon containing oxygen as an impurity to furnish a substantially pure argon product and charging the thus purified argon as a gas into containers under relatively high pressure which comprises initially compressing the impure argon to an intermediate pressure at least sufficient for its subsequent purification, adding to the impure argon an amount of hydrogen in excess of the stoichiometric amount required for the reaction of said hydrogen with said oxygen impurity to form water, passing the compressed, impure argon and added hydrogen over a catalyst adapted to promote a catalytic reaction between the oxygen and hydrogen to form water and a substantially oxygen-free argon gas mixture, controlling the addition of hydrogen to said impure argon to maintain a predetermined residual amount thereof in said oxygen-free argon, recycling oxygen-free argon to said catalytic reaction and maintaining in said catalytic reaction a concentration of oxygen below about three precent, and drying oxygen-free argon obtained from said catalytic reaction, rectifying said dried oxygen-free argon mixture and forming a substantially pure, argon liquid free of hydrogen or oxygen, compressing said substantially pure, liquid argon to cylinder charging pressure, vaporizing said compressed liquid argon and charging the argon vapors thus formed into high pressure containers.

3. The method according to claim 2 wherein said dried, oxygen-free argon is separated in said rectification into a gaseous fraction containing hydrogen and a liquid fraction containing the argon free of hydrogen and oxygen, the purified argon thence being obtained from said rectification as a gas in a zone above a substantially pure liquid argon fraction and said purified argon gas is then liquefied prior to compression to cylinder charging pressure.

References Cited in the file of this patent

UNITED STATES PATENTS

| | | |
|---|---|---|
| 1,360,853 | Wucherer et al. | Nov. 30, 1920 |
| 1,658,631 | Dannenbaum | Feb. 7, 1928 |
| 2,019,632 | Ray | Nov. 5, 1935 |
| 2,284,662 | Kahle | June 2, 1942 |
| 2,409,458 | Van Nuys | Oct. 15, 1946 |
| 2,480,093 | Anderson | Aug. 23, 1949 |
| 2,582,885 | Rosenblatt | Jan. 15, 1952 |
| 2,587,820 | Cartier | Mar. 4, 1952 |

FOREIGN PATENTS

| | | |
|---|---|---|
| 746,009 | France | Feb. 27, 1933 |
| 295,572 | Germany | Nov. 29, 1916 |